April 7, 1970     P. H. CROFT     3,504,748
DRAG WHEEL FOR A GARDEN TILLER
Filed Jan. 2, 1969     2 Sheets-Sheet 1
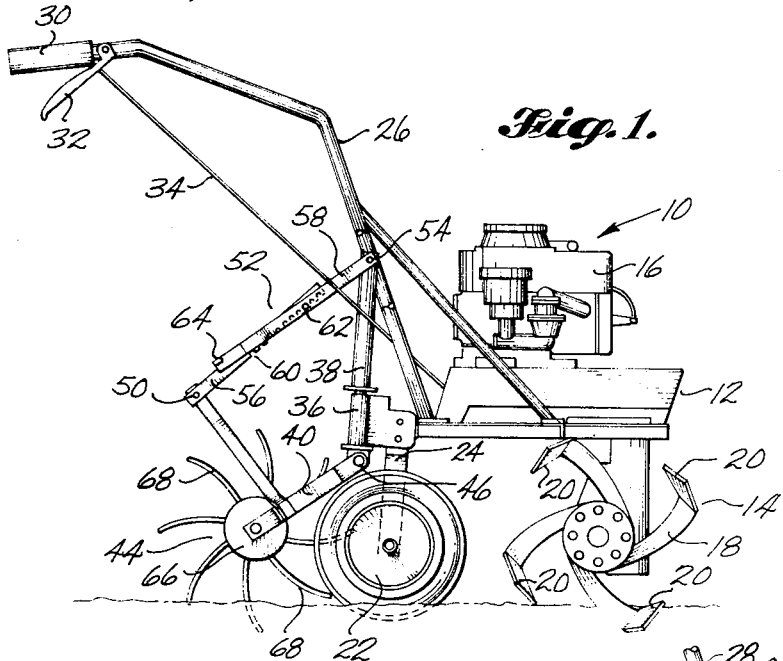
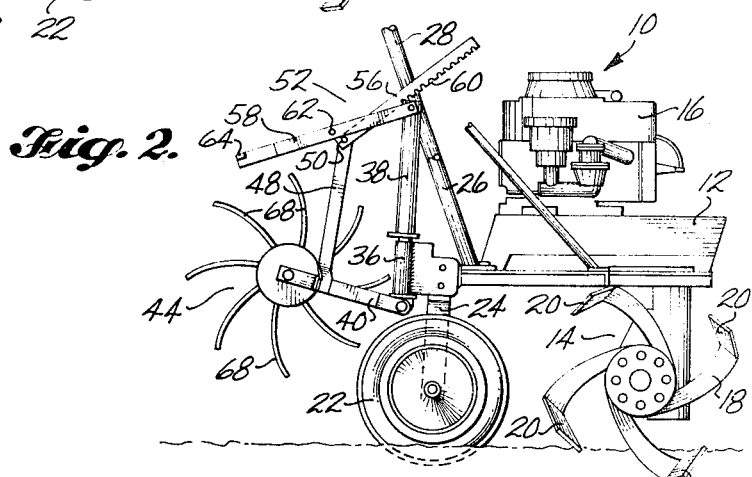
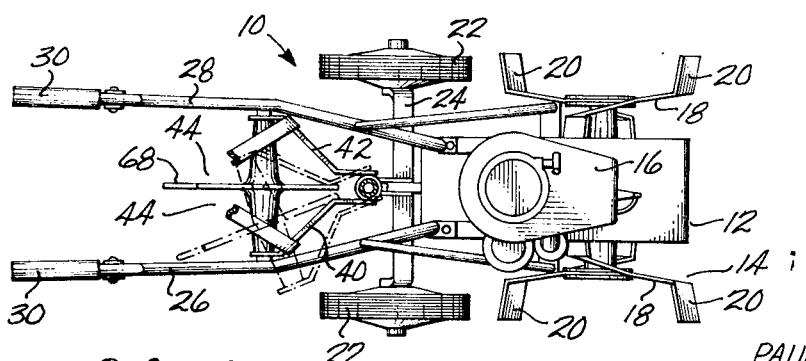
INVENTOR
PAUL H. CROFT
BY Graybeal, Cole & Barnard
ATTORNEYS

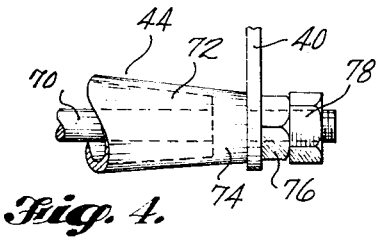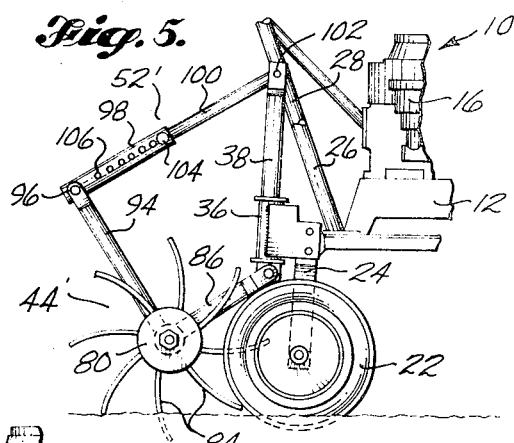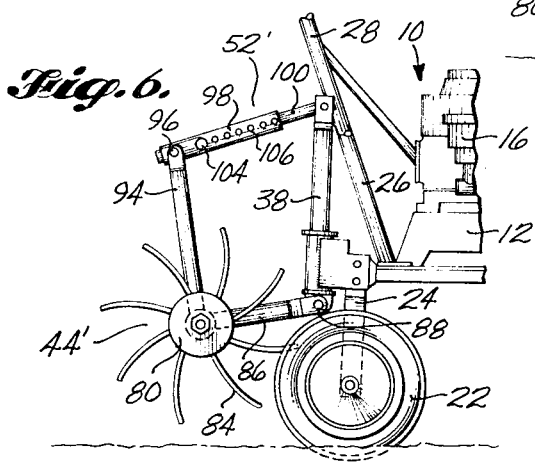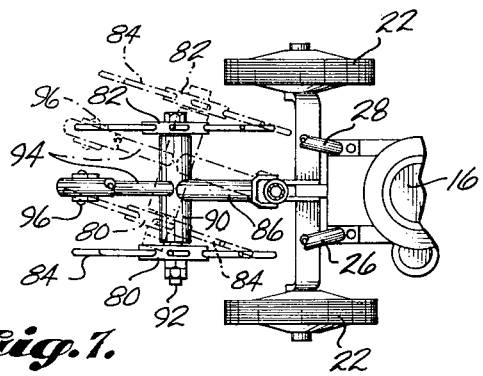

United States Patent Office 3,504,748
Patented Apr. 7, 1970

---

3,504,748
DRAG WHEEL FOR A GARDEN TILLER
Paul H. Croft, 5501 76th W. Tacoma, Wash. 98467
Filed Jan. 2, 1969, Ser. No. 788,440
Int. Cl. A01b *33/02*
U.S. Cl. 172—42       5 Claims

ABSTRACT OF THE DISCLOSURE

A wheel comprising a hub and a plurality of radiating tines is supported rearwardly of the tiller. The supporting means is adjustable so that the amount of penetration of the drag wheel into the soil can be controlled, and the drag wheel can be lifted up into a transport position above the ground level. The drag wheel is mounted for sideways pivotal movement, to facilitate turning. The drag wheel includes means for varying its willingness to turn freely in the soil.

---

BACKGROUND OF THE INVENTION

Field of the invention

This invention relates to garden type rotary tillers, and more particularly to rotary drag wheel mechanisms for such tillers.

Description of the prior art

Rotary tillers of the garden type are characterized by a forwardly placed tilling wheel which is trailed by a stick-like drag bar. During use of the tiller the drag bar extends downwardly into the soil rearwardly of the wheel. The tiller wheel is a traction device and tends to propel the tiller forwardly. The drag bar resists this tendency, and in so doing causes the tiller wheel to drive itself downwardly into the soil, thereby increasing the tilling action. Three disadvantages of tillers which include drag bars are: (1) the drag bars catch on uncut roots, (2) the drag bars tend to collect debris forwardly of themselves and this debris piles up until it is necessary to stop the tiller and clean the debris away, and (3) the drag bar makes the tiller difficult to turn.

SUMMARY OF THE INVENTION

According to the present invention the conventional single tine drag bar is replaced by a drag wheel. In preferred form the drag wheel includes a plurality of ground engaging tines, each of which is convexly curved in the direction of rotation and the drag wheel is mounted for side-to-side pivotal movement, in caster-like fashion, rearwardly of the tiller. The rotating action of the wheel prevents the tines from catching on uncut roots. The convex curvature of the tines in the direction of rotation, together with rotation itself, prevents plant parts and other debris from piling up in front of the drag element, and the side-to-side pivotal mounting of the drag wheel makes it easy to turn and steer the tiller.

Other aspects of the invention involve specific constructions of the various parts of the drag wheel assembly which are hereinafter described, with reference being made in the description to the accompanying drawing.

BRIEF DESCRIPTION OF THE DRAWING

FIG. 1 is a side elevational view of a soil tilling device equipped with a drag wheel constructed in accordance with the present invention, such wheel being shown in its lowered or operative position;

FIG. 2 is a view like FIG. 1, but with the upper portion of the handle bars omitted and the drag wheel shown supported in its upper or transport position;

FIG. 3 is a top plan view of the tilling device, including a solid line showing of the side-to-side pivotal drag wheel assembly in a straight ahead travel position, and a broken line showing of such assembly in a turning position;

FIG. 4 is a fragmentary view near one end of the drag wheel axle, showing a typical embodiment of means for applying an adjustable rotation resisting force on the drag wheel;

FIG. 5 is a fragmentary side elevational view of a tilling device equipped with a modified form of drag wheel attachment, characterized by a pair of rotating elements and a different type of adjustable support arm in the mounting linkage;

FIG. 6 is a view like FIG. 5, but showing the wheel assembly in its upper or transport position; and FIG. 7 is a fragmentary top plan view of the tilling device shown by FIGS. 5 and 6, presenting a solid line showing of the drag wheel assembly in a straight ahead position, and a broken line showing of such assembly in a turning position.

DESCRIPTION OF THE PREFERRED EMBODIMENTS

In FIGS. 1–3 the numeral 10 generally designates a rotary soil tilling device or "tiller" of a small size, especially useful for gardening. The tiller 10 is provided with a chassis 12 driven from an internal combustion engine 14 mounted on the chassis 12 above and rearwardly of the rotor 14. The rotor 14 revolves on a transverse axis and carries a number of tines 18 terminating in hoe-like members 20 which are shaped and arranged to dig into and till the soil as the rotor 14 revolves in the clockwise direction as seen in FIG. 1. When the rotor 14 revolves in the counterclockwise direction the hoe-like members 20 act to lift the rotor 14 up onto the tilled soil and propel the tiller 10 rearwardly. As will be appreciated, the tine-carrying rotor 14 not only effects tilling of the soil as the rotor 14 revolves in the clockwise direction, but it also serves as a traction means to support the chassis 12 and to propel the tiller 10 along the ground being worked.

To facilitate transportation, the tiller is preferably provided with a pair of rubber tired wheels 22 supported from the rear of the chassis 12 by means of a mounting frame 24. The particular tiller shown by FIGS. 1–3 is quite similar to the tiller marketed by Simplicity Manufacturing Company of Port Washington, Wis., and sold under the trade name "Roticul." However, the rotary drag wheel of the present invention is also usable with the many other similar makes of small garden type tillers. In the Roticul tiller the wheels 22 are used for transportation only. They are removed during use of the tiller for tilling the soil. Other makes of garden tillers retain the transport wheels on the tiller during the tilling operation.

The "Roticul" type of tiller is fully described in U.S. Patent No. 2,903,077, which issued on Sept. 8, 1959, to Igor Kamlukin. The details of the drive train will not be specifically described herein since they are quite thoroughly described in U.S. Patent No. 2,903,077. Accordingly, the disclosure of U.S. Patent 2,903,077 is hereby expressly incorporated herein by reference.

Referring again to FIGS. 1–3 of the drawing, a pair of handle bars 26, 28 are secured at their lower ends to, and extend upwardly and rearwardly from the chassis 12. The handle bars 26, 28 may be equipped with hand grips 30 at their rearward ends, and the right handle bar 26 is equipped with a control lever 32. An elongated control rod 34 is interconnected between the lever 32 and a reversible transmission carried by the chassis 12, below the engine 16.

Conventional garden tillers, such as the aforementioned "Roticul" tiller, are equipped with a drag bar which is mounted on the chassis to the rear of the transport wheels. The drag bar consists of a single tine of sufficient length that its lower end portion extends into the ground and tends to resist forward propulsion of the tiller by the rotor 14, and in so doing co-acts with the rotor 14 to effect the desired tilling. According to the present invention, such drag bar is replaced by a drag wheel which, as will be seen, possesses several advantages over the now used drag bar.

FIGS. 1–3 show the chassis 12 as including a vertically oriented bushing or bearing housing 36 which rotatably supports a mounting rod 38 for rotation about a generally vertical axis. The lower end portion of the mounting rod 38 projects below the housing 36 and, of course, rotates with the rest of the rod 38. In the preferred embodiment the front ends of two members 40, 42, which together form a mounting yoke for the drag wheel 44, are secured by a transverse pivot pin or the like to the lower end portion of the rod 38. Accordingly, the mounting yoke 42, 44 is pivotally movable generally vertically up and down about the transverse pivot pin 46. A second yoke 48 is secured at its widely spread lower ends to the rearward portions of the members 40, 42, and extends upwardly and substantially normally from the frame members 40, 42. The upper ends of the two members constituting yoke 48 are brought together and are pivotally connected at 50 to one end of an adjustable connector arm 52. The opposite end of arm 52 is pivotally connected to the upper end of rod 38 by a transverse pivot pin 54. According to the invention, the adjustable support arm 52 may be constructed in two parts 56, 58. Part 56 is shown to be a single flat bar formed to include a plurality of axially spaced notches 60 in the lower edge thereof. Part 58 is shown to constitute a pair of parallel flat bars which are disposed on opposite sides of the bar 56. A cross pin 62 extends between the two bar elements of part 58, intermediate the ends of part 58, and a cross bar 64 rigidly interconnects the rear ends of such bar elements. In use, adjustment is effected by the operator selectively mating the pin 62 with the notch 60 which will provide arm 52 with the desired length. As shown by FIG. 1, when the pin 62 is nested within one of the notches 60, the weight of the drag wheel assembly causes the cross bar 64 to come to rest in a bracing or supporting position on the upper edge of bar element 56.

Since adjustable arm 52 and rigid yoke 40, 42 are connected to the opposite ends of the rod 38, and the rod 38 is mounted for pivotal movement about a generally vertical axis, the entire wheel assembly is mounted for side-to-side pivotal movement. This pivotal movement is "free" pivot movement since the bearing or bushing 36 mounts the rod 38 for free rotation.

In FIG. 1 the drag wheel 44 is shown to be set into a lowered or tilling position. The wheel 44 is shown to comprise a single hub 66 and a plurality of times extending generally radially outwardly from the hub 66. Some of the tines are designated 68. The tines 68 are shown to be curved somewhat, so that they present a convex curvature in the direction of rotation. This configuration of the tines 68 is advantageous (but not always necessary) because it allows roots, plants, and other debris to readily fall off from the tines 68. The principle advantages of the rotary drag bar are that it produces a relatively constant dragging force which is not characterized by a dig and release type action; it does not catch on uncut roots; and it does not pile plant parts and other debris in front of itself.

Referring now to FIG. 3, the drag wheel 44 is shown to easily follow the tiller during turning, much in the fashion of a "caster wheel." This is a very desirable feature, because considerable effort must be expended during turning of a tiller that is equipped with a straight, single tine drag bar. Either the tiller must be lifted and held in a lifted position, so that the drag bar is entirely out of contact with the soil during turning, or the drag bar must be muscled sideways through the soil during turning. This is not necessary with the tiller of the present invention.

FIG. 2 shows the drag wheel assembly moved up into a transport position. Note that with the particular adjustable support arm 52 that is included in a preferred embodiment, it is only necessary to hook one of the adjustment notches 60 onto the rearward rim portion of the upper end of member 38. Member 38 is preferably tubular and has an open upper end. Accordingly, it includes a thin wall rim at its upper end which will easily fit into one of the notches 60.

Preferably, the drag wheel 44 is provided with some means for adjusting its turning tendency (or resistance). By way of typical and therefore nonlimitive example. FIG. 4 shows one simple method of providing an adjustable friction force acting on the wheel 44. The mounting means for the wheel 44 is shown to include a central bolt or axle 70 which extends lengthwise through an elongated hub portion 72 of the wheel 44 and through the lower, rearward ends of the yoke members 40, 42. The hub 72 is shown to include end portion 74 which rather snugly surround the axle 70. Each end of hub 72 is a flat surface of substantial area which contacts the inner surface of the member 40, 42. An adjustment nut 76 is provided at each end of axle 70, immediately outwardly of the member 40, 42 at such end, and a lock nut 78 is provided outwardly of each adjustment nut 76. The adjustment nuts 76 are merely tightened or loosened, as desired, to obtain the frictional drag forces on the ends of hub 72 which are necessary to cause wheel 44 to rotate at the desired speed. As will be evident, tightening of the nuts 76 will make it difficult for the wheel 44 to rotate, causing it to provide greater resistance to forward travel accompanied by a greater tendency of the wheel 14 to till the soil.

FIGS. 5–7 disclose a modified form of drag wheel assembly. This form is principally characterized by a drag wheel 44' having two rotary parts 80, 82, each having a plurality of generally radially projecting tines 84. As best shown by FIG. 6, in this form the support yoke 40, 42 is replaced by a support element 86 having a forked forward end which is pivotally connected at 88 to the lower end of bar 38, and is anchored at its rear end to a midportion of an elongated, transverse support hub 90. In this form a support axle for the wheels 80, 82 projects axially through the hub 90 and projects outwardly from each end thereof, and the wheels 80, 82 are supported on the end portions of the axle 90. Also in this form the rearward support yoke 48 is replaced by a strut 94 having a forked upper end which is pivotally attached at 96 to a rearward portion of a hollow tube 98 equipped with a roll of adjustment holes. Tube 98 and a rod 100, which is telescopically received in tube 98, together make up the adjustable support arm 52'. The forward end of rod 100 is pivotally attached to the upper end of rod 38 at 102. The rod 100 carries a spring loaded button 104 adapted to be depressed by the thumb of the user. As should be evident, when the rod 100 is moved relatively through the tube 98, it will catch in each succeeding adjustment opening 106, and will stay locked therein until depressed.

As used herein the term "wheel" means a rotating device and is not limited to a single hub equipped with a single set of tines, but rather includes a rotary device having either a single or a plurality of rotating hubs, each one of which is equipped with a plurality of tines. Also, it is to be understood that even though the particular support means for the drag wheel are considered to be a part of the present invention, the support means can be constructed to take other forms from those illustrated and described.

The advantages of using a pair of drag wheels are two fold. Firstly, the lateral spacing of the wheels increases the lateral stability of the tiller, helping to maintain it in an upright position. Secondly, the additional tines in the soil provide additional drag.

The use of spoke-like tines of a rotating wheel or wheels results in the elimination of the deep furrows or ditches dug by conventional drag bars. In fact, when used without the transport wheels a tiller equipped with a drag wheel left hardly a mark in the newly tilled soil, yet it performed properly as a drag element.

The foregoing description and the drawing are provided for the purpose of disclosing typical embodiments of the invention so as to impart a clear understanding of the invention.

What is claimed is:

1. In a power driven hand guided soil tilling device which includes a chassis frame having handle means by which the device may be guided by a walking attendant, a cultivating rotor journaled on the frame with its axis horizontal and transverse to the frame, said rotor having hoe-like tines shaped to dig into and till the soil as a consequence of rotation of the rotor, and ground engaging drag means rearwardly of said cultivating rotor operable to resist forward propulsion of the tilling device by the rotor and thus cause the rotor tines to dig into and effect tilling of the soil, the improvement characterized by said drag means comprising:

drag wheel means including a plurality of generally radially extending tines;
   means journaling said drag wheel means for free rotation about a generally horizontal axis; and
   support means interconnected between said journal means and said chassis frame and serving during normal operation to support said drag wheel means in a position with the tines thereof partially buried in the soil, said support means including a drag wheel frame which carries the drag wheel means and its journaling means, pivot means mounting said drag wheel frame for vertical pivotal movement about a generally horizontal axis, and adjustable brace means interconnected between a rearward location on said drag wheel frame and a relative upper forward location on said chassis frame, with length adjustment of said brace means serving to adjust the attitude of said wheel frame means relative to said horizontal axis.

2. The improvement of claim 1, wherein said support means also includes means journaling the forward end portion of the drag wheel frame for free sideways pivotal movement about a generally vertical axis, so that said drag wheel means is free during turning of the tilling device to follow the cultivating wheel in caster wheel fashion.

3. A drag wheel attachment according to claim 1, wherein said drag wheel includes a hub and said attachment includes adjustable means for applying a friction force on said hub, so that an adjustable braking force can be applied to said wheel, for retarding its free rotation.

4. A drag wheel attachment for a power driven hand guided soil tilling device having a chassis frame, comprising:

drag wheel means including ground catching means;
   means journaling said drag wheel means for free rotation about a generally horizontal axis;
   support means interconnected between said journal means and the chassis frame, including a drag wheel frame serving during normal operation to support said drag wheel means in a position with the ground catching tine means thereof partially buried in the soil;
   means supporting said drag wheel frame, and hence the drag wheel itself, for sideways pivotal movement about a generally vertical axis, said support means comprises a rotatable post, and means attaching the forward end of the drag wheel frame to the lower end of the post; and
   means for adjusting the depth of the drag wheel in the soil comprising adjustable brace means interconnected between a rearward location on said drag wheel frame and the upper end of the post.

5. A drag wheel attachment according to claim 4, wherein said drag wheel includes a hub and said attachment includes adjustable means for applying a friction force on said hub, so that an adjustable braking force can be applied to said wheel, for retarding its free rotation.

References Cited

UNITED STATES PATENTS

| 1,843,028 | 1/1932 | Kelso | 172—555 X |
| 2,796,819 | 6/1957 | Johnson | 172—540 |

FOREIGN PATENTS

| 573,908 | 12/1945 | Great Britain. |

ROBERT E. PULFREY, Primary Examiner

W. J. CONLON, Assistant Examiner

U.S. Cl. X.R.

172—43, 63, 71, 540